3,779,959
METHOD OF MAKING PHENOLIC
RESIN FOAMS

Peter Pinten, Totilastr. 2, Cologne-Deutz, Germany; and Franz Weissenfels, Am Grafenkreuz 17; and Hans Jünger, Ziethstr. 190, both of Siegburg, Germany
No Drawing. Filed Nov. 26, 1965, Ser. No. 510,088
Claims priority, application Germany, Dec. 17, 1964,
D 46,078
Int. Cl. C08g 53/08
U.S. Cl. 260—2.5 F                    3 Claims This invention relates to phenolic resin foams. More particularly this invention is concerned with novel phenolic resin foams and processes used in producing the same.

The manufacture of foam materials from liquid phenolaldehyde resins is known. In general, in the prior art, the liquid phenolic resin is mixed with a blowing agent and an acid hardener. The thusly formed foamable mixture is then placed in a mold which is not sealed in an air-tight manner. The foaming and hardening are then carried out either at 40–60° C. or at room temperature without the use of external heat, depending on the type of phenolic resin used. After ½ to 3 hours, the formed body can be stripped from the mold, preferably after being allowed to cool, and further processed.

The blowing agents used in the conventional production of foams are classified into two groups. One group consists of alkali or alkaline-earth carbonates and metal powders which are introduced in very finely divided form into the liquid phenolic resin. They react with the acid content in the hardener to evolve $CO_2$ or $H_2$, as the case may be. The gas developing in the form of small bubbles expands the phenolic resin to a foam. The hardener, which is present in excess, brings about the hardening. The second group of blowing agents comprises low-boiling organic compounds, such as carbontetrachloride, ethylenedichloride, n-butyl ether, methylal, n-pentane, chlorofluoromethane, or the like. These latter materials are vaporized by the heat evolved in the condensation of the resin or by additionally supplied heat, thereby bringing about foaming of the liquid phenolic resin. Simultaneously with the foaming process, the hardener present in the mixture produces an increasing solidification, and finally a hardening of the foam.

The size of the cells in the above-described foaming materials is determined by a number of factors: The size of the cells depends for one thing on the nature and quantity of the blowing agent used, the reaction temperature, and the hardening characteristics of the resin. Thus, by changing the type and quantity of the foaming or interlacing agent, the temperature employed, and the composition of the resin, it is possible to produce foams of different density, hardness, and rigidity, i.e., foams having pores of different sizes.

It is additionally known in the art to add surface-active substances to the resin in order to promote a uniform distribution of the blowing agent and of the gas bubbles. Polyethylene ethers of monolaurine-sorbitol ester and ethylphenolethylene oxide condensation products have been described as being effective in this regard. For the practical applications of phenolic resin foam, it is often desirable that both finely porous and coarsely porous foams be available as wanted. For insulation against heat or cold, for example, a finely porous material is desired. On the other hand, coarsely porous phenolic resin foams are desired for lamination, for example, to bituminized roofing papers or the like, because better adhesion is achieved with them on account of the better anchoring of the adhesive in the larger cells.

It is, accordingly, an object of this invention to provide an improved process for obtaining phenolaldehyde resin foams using low-boiling organic blowing agents and a surface-active agent wherein the volume of the individual cells can be reliably controlled.

Another object of this invention is the preparation of a novel phenolic resin foam composition.

Other objects will appear hereinafter.

These objects are accomplished by the present invention, wherein foams are produced from liquid phenolic resins utilizing organic low-boiling blowing agents in the presence of surface-active materials and acid hardening agents, wherein, as the surface-active agent, castor oil rendered water-soluble by ethoxylation is utilized alone or in admixture with an ethoxylated nonyl phenol in a total amount of 0.5 to about 5% of the weight of the liquid phenolic resin, the volume of the individual cells that are formed being controlled by the percentage of the ethoxylated nonyl phenol. Thus, for example, a water-solubilized castor oil having an average ethoxylation of 40 and nonyl phenol having an average of 6 to 8 mols of ethylene oxide are suitable for use in combination with n-pentane and/or monofluorotrichloromethane as foaming agent. If, together with the blowing agent or agents, a mixture of 50 parts by weight of each of the aforesaid surface-active compounds is added in an amount of 0.5 to about 5% of the liquid phenolic resin, an irregularly coarse-pored foam is obtained. But if the ratio of the said surface-active substances is modified so that the percentage of ethoxylated castor oil is increased, foams are produced with increasingly more uniform cells of decreasing average diameter, until finally, if there is no ethoxylated nonyl phenol in the mixture, a uniform, very fine-pored foam is obtained whose cell diameter amounts to 0.02 to 0.2 mm. If, however, the percentage of ethoxylated nonyl phenol is increased, one obtains, at around 90 to 98 parts by weight of ethoxylated nonyl phenol to 10 to 2 parts by weight of ethoxylated castor oil, uniformly coarse-pored foams with cell diameters that vary accordingly.

The phenol-aldehyde resins are preferably phenolformaldehyde resins and can be condensation products of phenol with other aldehydes or formaldehyde-yielding materials.

Included within the scope of the invention are resins obtained by condensation of chlorophenol, cresol, chlorocresol, resorcinol and the like with formaldehyde or a formaldehyde yielding material.

As organic low-boiling blowing agent, there may be suitably employed n-pentane, monofluorotrichloromethane, petroleum ether (30/40) as well as other benzene fractions having as upper boiling limit 60° C., methylene chloride, carbon tetrachloride, trifluorotrichloroethane, N-pentane and monofluorotrichloromethane are, however, preferred.

Illustrative of the hardeners suitable for use herein are the conventional acid hardeners and mixtures of acids as, for instance, hydrochloric acid, sulfuric acid, o-phosphoric acid, organic sulfonic acids, such as phenol sulfonic acid, benzene sulfonic acid and p-toluol sulfonic acid. A preferred hardener is the mixture of hydrochloric acid with glycol.

The foamed phenol-aldehyde products of the invention are a known class, namely, the class of which foamed phenol formaldehyde resin is representative. The materials of the invention are useful in the manner in which such known foams are useful.

The proportions of blowing agent, hardener, etc., can be, as is known in the art, for the production of phenolaldehyde resin foams.

The following examples are presented to show methods of producing certain of the novel phenolic resin foams included within this invention. It is to be understood, however, that these examples are included only for purposes of illustration, and that the invention is not to be restricted to the embodiment specifically disclosed therein.

The phenolic resins used in the examples described hereinafter were prepared as follows:

RESIN A 143 parts by weight of phenol were condensed with 228 parts of a 30% aqueous formaldehyde solution in the presence of 0.0715 part by weight of sodium hydroxide, in aqueous solution, for 70 minutes at 100° C. The reaction mixture thus obtained was then distilled in a vacuum to a solid resin content of 72-78%. This resin had, at 20° C., a viscosity of 4,000 to 7,000 cp. (Hoeppler).

RESIN B 143 parts by weight of phenol were condensed for 50 minutes at 100° C. with 243 parts by weight of a 30% aqueous solution of formaldehyde, in the presence of 4.3 parts by weight of sodium hydroxide in aqueous solution, and the reaction mixture thereby obtained vacuum distilled to a solid resin content of 70 to 75%. This product had, at room temperature, a Hoeppler viscosity of 3,000 to 5,000 cp.

Example 1

Phenolic resin foam blocks having different pore sizes were manufactured by mixing together intimately the individual components and then pouring the resultant batches into open top box molds having a bottom surface measuring 50 x 50 cm. and a height of 100 cm. The foaming was conducted along with simultaneously increasing solidification of the foam at 20–25° C. within 10 to 30 minutes. After about 60 minutes, the hardened foam blocks could be stripped from the molds. After complete cooling they were sawed into boards.

The various average cell diameters produced with the use of the different cell regulators are listed in Table 1.

TABLE 1

| Resin A, kg | 10 | 10 | 10 | 10 |
|---|---|---|---|---|
| Cell regulators: | | | | |
|   Ethoxylated castor oil, g | 7.5 | 15 | 30 | 300 |
|   Ethoxylated nonyl phenol, g | 292.5 | 285 | 270 | |
| Blowing agent: n-pentane, cc | 1,000 | 1,000 | 1,000 | 1,000 |
| Hardener: Equal parts by weight of glycol and 37% hydrochloric acid, cc | 1,000 | 1,000 | 1,000 | 1,000 |
| Diameter of foam cells in mm. in the direction of foaming | 3–6 | 2–4 | 1–2.5 | 0.02–0.2 |

Example 2

Mixtures were prepared with resin B. After pouring into the box molds described under Example 1, the foaming and hardening were carried out in a heated chamber at 60° C. in about 2 hours.

TABLE 2

| Resin B, kg | 10 | 10 | 10 |
|---|---|---|---|
| Cell regulators: | | | |
|   Ethoxylated castor oil, g | 12 | 290 | 300 |
|   Ethoxylated nonyl phenol, g | 288 | 10 | |
| Blowing agent: | | | |
|   Monofluorotrichloromethane, cc | 800 | | |
|   n-pentane, cc | | 1,000 | 1,000 |
| Hardener: Equal parts by weight of glycol and 37% hydrochloric acid, cc | 950 | 950 | 950 |
| Diameter of foam cells in mm. in the direction of foaming | 2.5–5 | 0.1–1 | 0.02–0.2 |

We claim:

1. A method of controlling the volume of the individual pores of a foam plastic prepared from an aqueous mass containing at least 70% by weight of a phenol aldehyde resin containing a liquid organic low-boiling blowing agent for producing the foam, a surface-active agent and an acid-hardening agent which comprises (a) preparing a plurality of samples of said foam plastic, the samples having a differing relationship in their respective pore volumes, said plurality being prepared by varying the relative proportion of castor oil rendered water-soluble by ethoxylation to ethoxylated nonyl phenol in said aqueous mass, (b) selecting a sample relative to such other samples which corresponds to the pore volume desired in the final foam plastic, and (c) preparing said final foam plastic from said aqueous mass containing the relative proportion of the selected sample, the combined amount of said castor oil and said ethoxylated nonyl phenol being between 0.5 and 5% referred to the phenol-aldehyde resin.

2. A method according to claim 1, wherein said final foam plastic is prepared by employing a mixture of castor oil rendered water-soluble by ethoxylation and ethoxylated nonyl phenol such that the ratio of castor oil rendered water-soluble by ethoxylation to ethoxylated nonyl phenol is greater than 1:1.

3. A method according to claim 1, wherein said final foam plastic is prepared by employing a mixture of castor oil rendered water-soluble by ethoxylation and ethoxylated nonyl phenol such that the ratio of castor oil rendered water-soluble by ethoxylation to ethoxylated nonyl phenol is less than 1:1.

References Cited

UNITED STATES PATENTS

| 2,446,429 | 8/1948 | Nelson et al. | 260—2.5 F |
| 2,608,536 | 8/1952 | Sterling. | |
| 2,629,698 | 2/1953 | Sterling | 260—2.5 F |
| 2,933,461 | 4/1960 | Mullen | 260—2.5 F |
| 3,003,977 | 10/1961 | Hurwitz et al. | 260—2.5 AG |
| 3,300,419 | 1/1967 | Erickson | 260—2.5 F |

MURRAY TILLMAN, Primary Examiner

M. FOELAK, Assistant Examiner

U.S. Cl. X.R.

260—19 R, 33.2 R, 33.4 R